April 10, 1973    R. J. MISTARZ ET AL    3,726,749
HEAT SEALING APPARATUS AND METHOD Filed June 17, 1971    3 Sheets-Sheet 3

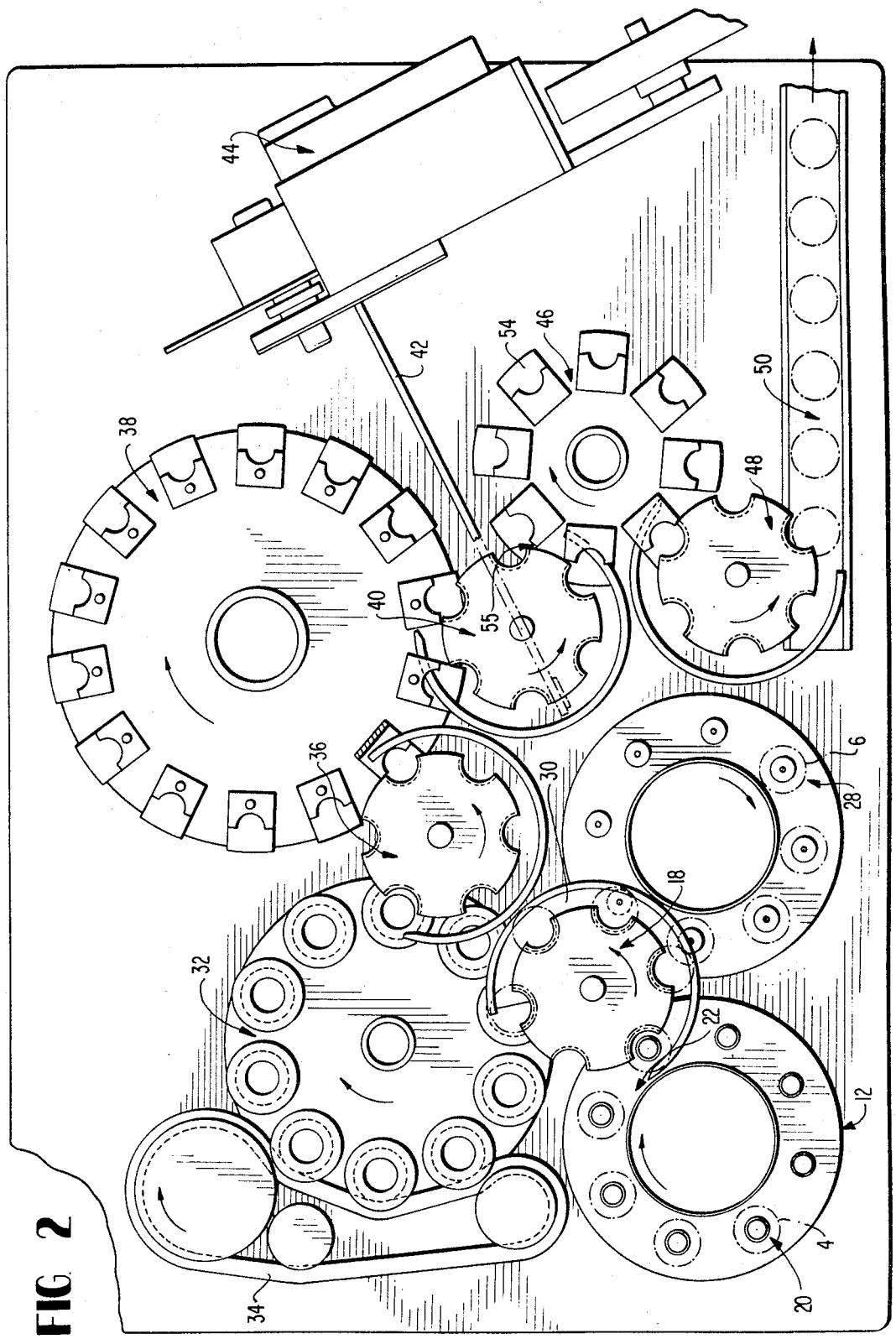

United States Patent Office 3,726,749
Patented Apr. 10, 1973

3,726,749
HEAT SEALING APPARATUS AND METHOD
Robert J. Mistarz, Northbrook, and Albert B. Mojonnier, Sr., Chicago, Ill., assignors to Koehring Company, Milwaukee, Wis.
Filed June 17, 1971, Ser. No. 154,062
Int. Cl. B30b 13/34
U.S. Cl. 156—580
12 Claims

ABSTRACT OF THE DISCLOSURE

Heat sealing apparatus for sealing a closure on the upper end of a thermoplastic container includes a continuously rotating annular heating plate that is continuously heated throughout its angular extent by electrical resistance means. A plurality of container holders are uniformly spaced apart beneath the annular heating plate. Each container is supported on a holder which prevents misalignments thereof and carries the container along a circular path beneath the annular heating plate. Cam means serve to raise and lower the container holders during revolution of the container holders about the circular path to press each container closure against the heating plate momentarily and effect sealing of the closure member to the container lip. Yielding means in the system for mounting the container holders protect the containers from being damaged as the closures are pressed against the heating plate.

CROSS REFERENCE TO RELATED APPLICATIONS

The disclosures of this application are related to the disclosures of the following applications of common inventorship filed concurrently herewith: Ser. No. 154,058 entitled "Automatic Plastic Bottling System and Method"; Ser No. 154,060, entitled "Pedestal Assembly"; Ser. No. 154,079, entitled "Jaw Operated Cup Dispensing Mechanism and Method," and Ser. No. 154,061, entitled "Trapped Cam Assembly."

BACKGROUND OF THE INVENTION

The invention is concerned generally with sealing containers with closure members and it relates particularly to apparatus and methods for heat sealing filled thermoplastic bottles with closure members.

It has been found that heat sealing has many advantages over adhesive type, snap cap and crimp cap sealing methods. Adhesive sealing apparatus and methods often require excessive cleaning and sometimes impart an uneven layer of material on the parts to be joined. Furthermore, adhesive sealing has often been unacceptable for application in industries marketing dairy, juice, and other food products as few, if any, of these adhesive seals meet FDA requirements, bearing contamination of milk, juice and other food products in containers. Snap and crimp caps, have heretofore not proven entirely satisfactory because of liquid leakage problems.

An alternate sealing method to those discussed above is heat sealing. Heat healing circumvents many of the aforementioned disadvantages and is generally a less expensive closure method. However, known heat sealing equipment has not been entirely satisfactory. For example, heat sealing apparatus of U.S. Pat. No. 3,345,797 discloses multiple, individually energized, heating elements. Such apparatus requires a relatively complicated electrical switching network to selectively heat in timed relation the appropriate alternately energized elements to the desired temperatures.

Other prior art individual heating elements are characterized by precisely shaped heating areas corresponding in shape to the closure and its corresponding container lip. The heat applied by such devices is generally directed only to the sealing areas taking care to avoid the open or non-contact areas. Although these systems are useful for some purposes, they require relatively accurate alignment of the container and closure with the heat sealing element, and they are not entirely suitable for high speed bottling operations.

An additional problem which must be faced in connection with high speed bottling operation is the danger of deforming the container lip as the closure is pressed into heat sealing engagement therewith. What is required is a gentle yet accurate heat sealing operation that will yield a proper seal without risk of injury to the container. Such considerations are particularly important in connection with the bottling of milk where a complete and hermetic seal is necessary to assure that health and safety standards are met.

SUMMARY OF THE INVENTION

This invention has as one of its objects the provision of apparatus and methods for accurately heat sealing closure members onto filled thermoplastic containers as the containers move sequentially along a circular path beneath an annular heater rotating at the same speed as the containers are moving along the path.

Another object of the invention is to provide a container sealing apparatus wherein preformed and filled containers having closures preassembled thereon are firmly but gently brought into momentary contact with a continuously heated annular heater as they are transported about a path coaxial with the heater.

Yet another object of the invention is to provide a heat sealing apparatus which maintains container positioning throughout and in turn raises each container, with its closure resting thereon, into abutting relationship with a portion of an annular heater while compensating for variations in container height and preventing container deformation during heat sealing.

In the sealing system of the invention, a plurality of container holders are moved about a circular path having a generally vertical axis, and an annular heater disposed above the container holders is rotated about the same axis at the same speed. Filled containers with closures resting thereon are supplied to the container holder as they pass one portion of the path. Later, as a loaded container holder moves along the circular path, it is raised vertically to bring its closure into contact with the lower surface of the heater to cause the closure to seal onto the container. Then the container holder moves down again, and the container with the closure sealed thereon is removed from the circular path.

The heater preferably is heated continuously over its entire annular extent so that an even temperature is maintained throughout the operation and so that energy supply fluctuations may be avoided. This arrangement also simplifies the electrical energy distribution system for the rotating annular heater.

Accuracy and uniformity of operation is further assured in accordance with preferred aspects of the invention by so constructing and operating the container holders that tipping of the containers and application of high loads to the containers is avoided. Each container holder has not only a container support surface but also at least one surface for contacting the side of the container and preventing tipping or shifting of the container toward the inside of the circular path of movement of the holders, and the proper orientation of these additional contact surfaces is maintained throughout the operation. Additionally, resilient means are interposed in the holder lifting systems so that each container may be lifted far enough to assure firm contact between its closure and the annular heater without risk of crushing the container or any portion thereof.

A more complete understanding of these and other features and advantages of the invention will be gained from a consideration of the following detailed description of an embodiment illustrated in the accompanying drawings.

BRIEF DESCRIPTION OF THE DRAWINGS

FIG. 2 is a somewhat diagrammatic plan view of the machine of FIG. 1.

DETAILED DESCRIPTION OF THE PREFERRED EMBODIMENT

Figure 1:
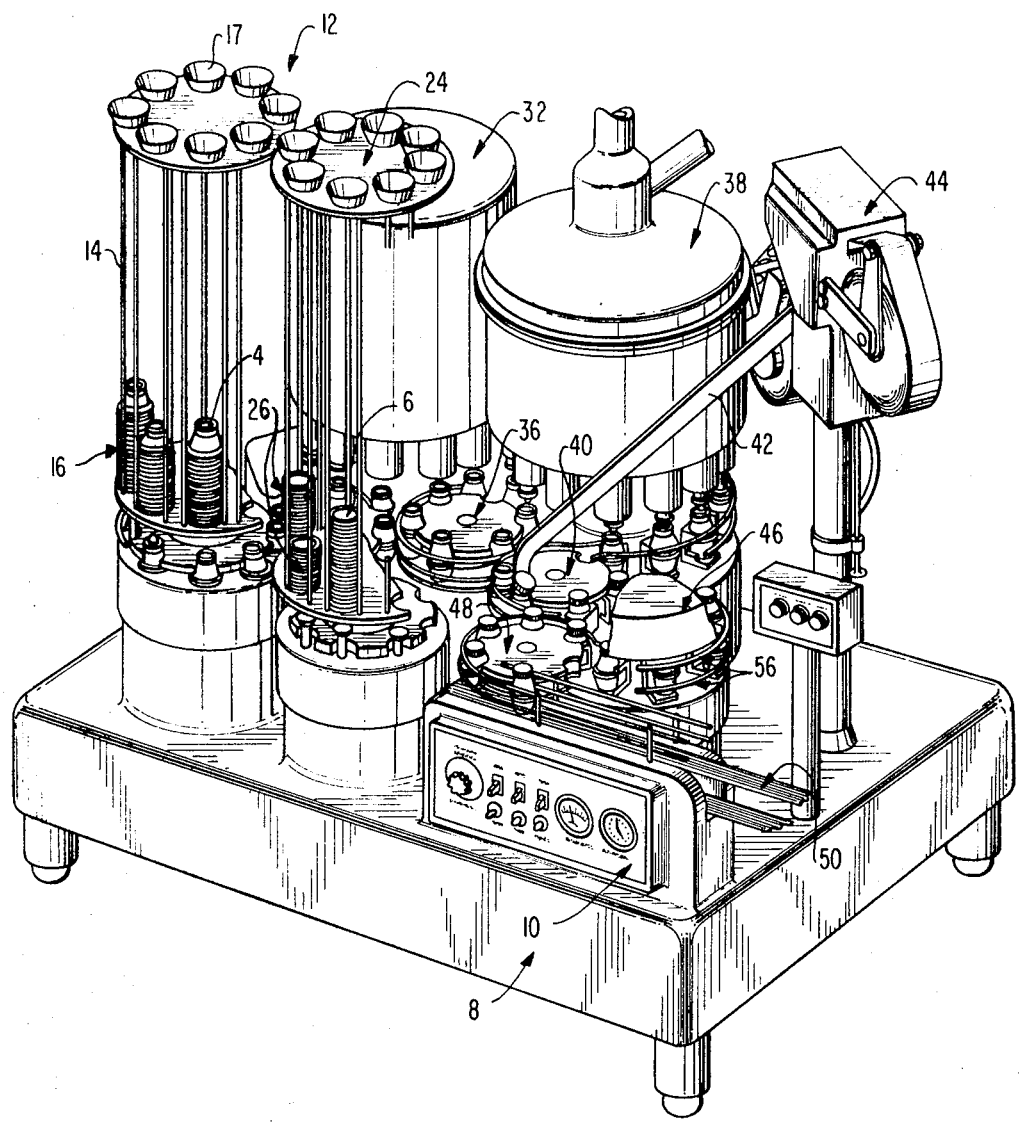
FIG. 1 is a perspective view of a machine making plastic milk bottles, filling the bottles, and heat sealing closures onto the tops of the bottles in accordance with the invention.

Although the invention is directed particularly to heat sealing apparatus and methods for sealing closure members or caps onto the tops of plastic containers or bottles, it will be helpful at the outset to describe generally the overall construction and operation of a milk bottling machine in which the new heat sealing apparatus is especially advantageous. Such a machine is illustrated in FIGS. 1 and 2. This machine assembles plastic containers from bulk supplies of nested container halves, fills the containers, and caps and seals the open tops of the filled containers. The various constructional and operational features of the machine are disclosed in detail in the several patent applications referred to above and the disclosure of each of them is incorporated herein by reference.

Figure 4:
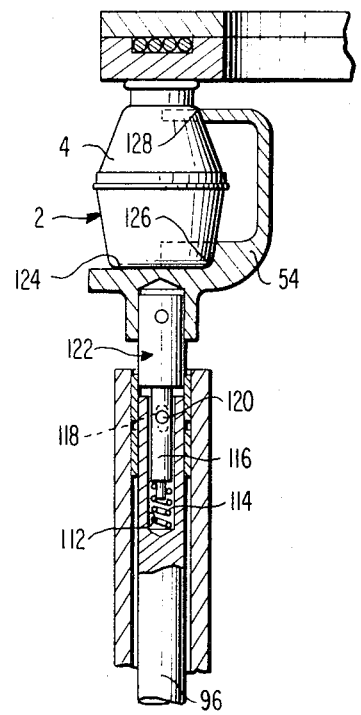
FIG. 4 is a vertical cross sectional view illustrating in greater detail features of the means by which the holders for the bottles are mounted and operated in the sealing unit of FIG. 3.
Figure 3:
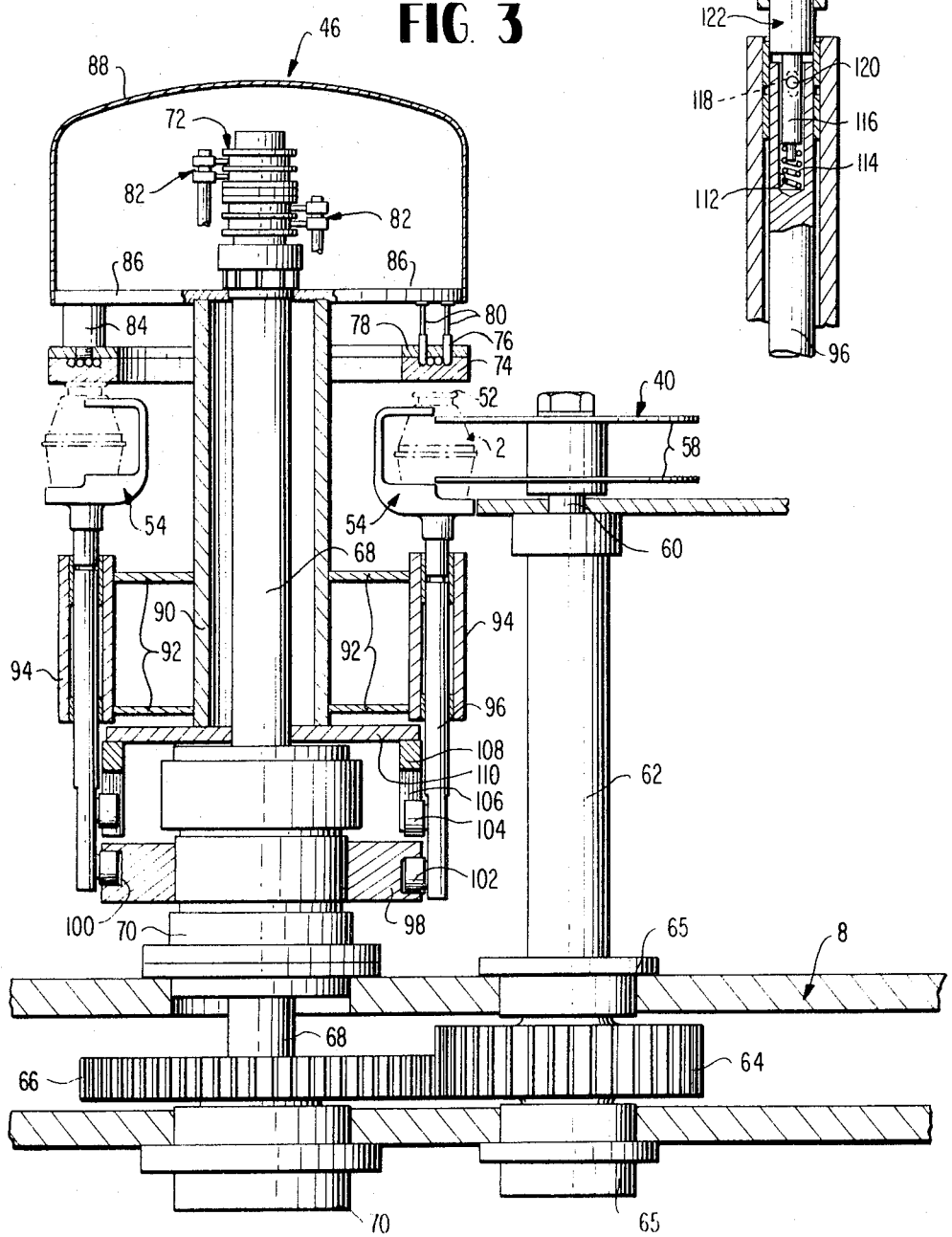
FIG. 3 is a vertical cross sectional view through the bottle closure sealing unit of the machine of FIGS. 1 and 2.

The containers are of configurations generally similar to that shown in U.S. Design Pat. 204,170, and indicated at 2 in FIGS. 3 and 4. These containers are assembled from separately fabricated container top halves 4 and container bottom halves 6, with the two halves of each container being frictionally welded together at the middle of the container.

The machine is in the form of a base or table structure 8 carrying thereon a control panel 10, a series of processing stations and means for transferring the container portions to and from the various processing stations. The processing stations are all rotatable units, and transfers between stations are accomplished through rotating star wheels, permitting the compact and efficient arrangement indicated in FIG. 1 of the drawings.

The first processing station of interest is that which supplies container top halves 4. This container top half supply unit or denester 12 includes means for holding eight vertical stacks of nested container top halves 4 and for delivering container top halves therefrom, one at a time, for subsequent processing. As illustrated, groupings of vertical rods 14 establish the outlines for the several stacks 16 of nested container top halves. Addition container top halves may be supplied to each of the stacks 16 through funnel means 17 at the top of the unit 12. The several stacks 16 are arranged in a circle and the whole is rotated about the axis of this circle.

Means located below the stacks 16 of nested container top halves operate at one angular portion of the circle to remove the bottom container from each stack as that stack passes through such portion. Then the removed container top half is transferred from the top denester unit 12 onto a star wheel device 18. This sequence is indicated in FIG. 2, wherein the top denester unit 12 is shown to be rotating in a clockwise direction and where a container top half portion 4 is indicated to have been removed from the bottom of one of the container stacks at location 20 and transferred from the top denester 12 to the star wheel 18 at another angular location 22.

The container bottom halves are supplied from a unit 24 which is similar in its functions to the top container half supply unit or denester 12. Here again eight stacks 26 of nested container bottom halves 6 are located in a circular path and the stacks are revolved about the axis of this circle. As indicated in FIG. 2, the bottom denester 24 rotates in a clockwise direction, a container bottom half 6 is removed from the bottom of each stack 26 as that stack rotates past an angular location 28, and the individual container bottom halves 6 are transferred to the star wheel 18 in the zone of tangency between the units.

The star wheel 18 is of course a dual level device. The container top halves 4 are moved along an intermediately located support surface 30, while the container bottom halves 6 are disposed below the surface 30 but in vertical alignment with corresponding ones of the container top halves 4.

As the star wheel 18 rotates in a counterclockwise direction, it brings the vertically aligned container halves to a spin welder unit 32. Here the container halves 4 and 6 are received on individual holders and moved clockwise about a circular path. During one angular portion of this path, the holders for the container bottom halves are brought into contact with a drive belt 34 which serves to spin at high velocity about its own axis each of the container bottom halves which are captured within the holders. During this same time interval, the top edge of the container bottom half and the bottom edge of the container top half are brought together vertically into abutting relation. Since the container top half is not rotating about its own axis but the container bottom half is rotating in this fashion, a great deal of heat is generated by friction as the edges come into contact with each other. This heat serves to weld the thermoplastic material and provide a strong leakproof joint between the container edges at a location approximately in the middle of the joined container.

The joined container halves remain on the spin welder unit 32 for a sufficient time to permit adequate cooling of the newly formed joint. Then the containers are transferred one by one onto a star wheel unit 36 which delivers them to a filler unit 38.

The filler unit also is a rotating assembly. It receives the open topped containers at uniformly spaced locations about its periphery and revolves the containers through an arcuate path. A supply of the material, such as milk, to be introduced into the containers is located above the container support level of the unit, and as the containers move about the central axis of the unit they are raised individually into operative relationship to filler nozzle means which also rotate about the axis of the unit and which are disposed in vertical alignment with the container support stations. As each container is brought into operative relationship to the overlying filler nozzle, a measured portion of milk begins to flow into the container. The time during which the container is allowed to remain in operative relationship to the filler nozzle may, for example, serve to establish the quantity of milk introduced into the container. Thereafter, the container is lowered from contact with the filler nozzle and transferred from the filler unit 38 to another star wheel device 40.

While under the control of the star wheel device 40, each of the now filled containers passes beneath the end of a container closure or cap supply device 42. This device 42 receives caps formed in a mechanism 44 and disposes one such cap over the open top of each of the filled containers.

The filled containers with the caps resting thereon then move one by one onto the periphery of a heat sealer unit 46. This unit will be described in greater detail below. It will be sufficient here to point out that each container moves clockwise about the central vertical axis of the heat sealer unit 46, that each filled container is supported during such movement so as to prevent tipping and misalignment, and that each container cap is brought into contact with a heater to cause the cap to be sealed to the remainder of the top opening in the thermoplastic container.

Thereafter, the sealed filled containers are delivered from the heat sealer unit 46 onto a star wheel device 48 and transferred to a delivery conveyor 50. The delivery conveyor 50 carries the filled and sealed containers to another location for such further processing as may be desirable in arranging them for shipment or the like.

Having described generally the overall arrangement and operation of the bottling machine of FIGS. 1 and 2, it will be helpful to refer now to the constructional features of the heat sealing apparatus 46 illustrated in greater detail in FIGS. 3 and 4 of the drawings.

The filled plastic containers 2 with closure members or caps 52 resting thereon are delivered from the star wheel device 40 onto individaul container holders 54 mounted for movement in a circular path about the central axis of the sealer unit 46. Such transfer takes place of course at the angular zone where the star wheel periphery moves into a position of tangency to the path followed by the several holders 54, and the transfer is assisted by conventional stationary guide rails 56 partially illustrated in FIG. 1. The entrance end portions of the guide rails 56 intersect the path of the containers on the star wheel 40 and cause the containers to be shifted onto the holders 54 rather than permitting them to continue to move about the axis of the star wheel.

The star wheel device 40 includes upper and lower circular plates 58 having cutouts at their peripheries for engaging the outer peripheries of the containers 2. These plates 58 are carried by a shaft 60 extending through a stationary cylindrical member 62 and being connected at its lower end portion to a drive gear 84. This shaft 60 is journalled within bearing means carried by the frame or table 8 and indicated generally at 65 in FIG. 3.

The star wheel drive gear 64 is part of a gear train which interconnects all of the rotating components of the machine of FIGS. 1 and 2. For example, in a preferred machine there is power input to a drive gear for the filler units 38, and this drive gear (not shown) meshes with and transmits power to the star wheel drive gear 64.

The star wheel drive gear 64 in turn meshes with a heat sealer drive gear 66 attached to a hollow drive shaft 68 extending upwardly through the center of the heat sealer unit 46. This hollow shaft is rotatable in bearing means within housings 70 on the frame 8, and within the rotating shaft 68 there is another shaft (not shown) which is attached to the lower bearing housing 70 and held stationary thereby.

At its upper end the center stationary shaft supports a stationary armature assembly 72 which is a part of an electrical supply system for the heater means of the unit. This heater includes an annular member 74 of some appropriate heat conducting material such as aluminum. Electrical resistance means 76 extend entirely around the upper portion of the annular member 74 and are secured in place by an overlying plate 78 attached to the annular member 74 by suitable screw means or the like. Leads 80 extend upwardly from the electrical resistance means 76 and are connected electrically to brush devices 82 cooperating with the stationary armature assembly 72.

The annular heater made up of the members 74 and 78 is connected to a plurality of posts 84 which extend downwardly from a base plate 86 of a dome structure 88 at the top of the heat sealing unit 46. This base plate 86 is attached to the rotating shaft 68 so as to rotate therewith and so as to be held at a predetermined level above the frame 8 of the machine. The base plate 86 of the dome structure also serves to support the brush devices 82 and cause them to rotate about the armature assembly 72 as the shaft 68 rotates.

With this arrangement, it will be seen that the lower surface of the annular heater member 74 does not move up or down but does move about the axis of the shaft 68 at the same rate that the shaft itself rotates. The electrical resistance means 76 also rotates about the axis of the shaft 68 and is continuously supplied with power through the brushes 82.

Also attached to the base plate 86 of the dome structure 88 is a depending sleeve 90 coaxial with the central shaft 68. Strut means 92 extend outwardly from the sleeve 90 at locations spaced about the axis thereof to support cylindrical members 94. These cylindrical members 94 are spaced regularly about the central axis of the unit and each of them is disposed beneath a portion of the heater 74.

Within each of the cylindrical members 94 there is slidably mounted a supported rod 96 which protrudes below the lower end of the cylindrical member. A stationary cam member 98 is attached to the upper bearing housing 70 and has a cam track 100 at its periphery for cooperating with cam follower rollers 102 carried by the lower end portions of the several support rods 96. This cam track 100 is shaped to move each of the support rods 96 up and then down during each revolution of the rod about the central axis of the shaft 68.

Each of the support rods 98 also carries a guide roller 104 which rides in a vertical slot 106 provided in a member 108 secured to a plate 110 attached to the lower end of the rotating sleeve 90. Each slot 106 is of course always adjacent a particular one of the support rods 96, because both the plate 110 and the struts 92 rotate together about the axes of the central shaft. However, the disposition of the guide rollers 104 within the vertical guide slots 106 prevents the support rods 96 from rotating about their own individual axes during operation of the machine, and there is no danger that inadvertent rotation of a support rod 96 about its own axis might move its cam follower roller 102 out of the desired relationship with respect to the cam track 100.

An axial bore 112 is provided in the upper end of each of the support rods 96 as shown in FIG. 4. A resilient lifter as a compression spring 114 is disposed within the bore 112 and a mounting spindle 116 is slidably mounted within the bore 112 above the spring 114. A vertically elongated slot 118 in the support rod 96 cooperates with a pin 120 extending diametrically through the mounting spindle 116 to prevent rotation of the mounting spindle 116 relative to the support rod 96 but to permit limited vertical movement of these parts relative to each other.

The upper end portion of each of the mounting spindles 116 is connected by means 122 to one of the container holders 54. As shown best in FIG. 4, each of the container holders 54 includes not only an upwardly facing container support surface 124 but also a pair of laterally facing container contacting surfaces which engage side wall portions of the container to steady the container and provide protection against misalignment, tipping, or the like. One such contact surface is indicated at 126 in FIG. 4, and another is indicated at 128. Both are arcuate as viewed in plan and are capable of contact with the container 2 through arcs of substantial extent.

These arcs open outwardly from the axis of the central shaft 68 of the apparatus, and the contact surfaces prevent movements of the container 2 inwardly of its intended path without interfering in any way with the transfer operations required for placing containers on and removing them from the support surfaces 124 of the holders 54.

The operation of the heat sealing apparatus of FIGS. 3 and 4 should now be evident. Each filled container 2 having a closure member 52 resting upon its upper lip is delivered from the star wheel device 40 onto one of the container holders 54 where it is supported and prevented from tipping by the various surfaces 124, 126 and 128. As this container holder 54 moves along its circular path around the central axis of the shaft 68, the support rod 96 associated therewith will of course also move through a circular path about the central axis of the shaft 68. In doing so, the support shaft 96 will cause its cam follower roller 102 to move along the cam track 100.

The cam track 100 has a configuration such that the roller 102 will move upwardly from the position it occupies at the time when a container is delivered to its container holder 54. Upward movement of a support rod 96 tends to move the associated mounting spindle 116 upwardly also, the force being transmitted through the compression spring 114. As a result, the container holder 54 will be raised sufficiently to gently press the container closure 52 for a definite time interval against the downwardly facing surface of the annular heater 74. This pressing action is firm but yielding because of the presence of spring 114. Consequently, good heat transfer is assured without substantial risk of injury to the container or the container cap. During the sealing operation the temperature of member 74 must be accurately controlled to accommodate the various operating speeds of the machine and the physical properties of the container and closure member materials. This is important to assure proper sealing of the closure member to the container and to prevent melting or distortion of these elements.

After the container cap has been pressed a definite period of time against the heater, the shape of the cam track 100 is such that the cam follower 102 and the associated parts begin to move downwardly. The cap moves out of heat conducting relationship with the heater 74, and the container holder 54 is returned to a level appropriate for the transfer of the sealed container to the star wheel 48 which delivers the container to the output conveyor 50 of the machine.

Although a single embodiment of the invention has been illustrated and described in detail, it will be evident that not all of the features of the invention need be used together in every instance and that various modifications may be made without departing from the principles of the invention. Accordingly, it is to be understood that the foregoing description should be considered as exemplary and that the scope of the invention should be ascertained from the following claims.

What is claimed is:

1. Apparatus for heat saling a closure member to a container comprising:
   a plurality of container holders each movable along a circular path having a generally vertical central axis,
   an annular heater mounted for rotation about said axis and having a lower surface facing said container holders,
   means for rotating said heater and moving said container holders about said axis at the same rate, and
   means for moving each of said container holders up and down as such container holder moves about said path to permit a container with a closure member resting thereon to be spaced below said heater at a first angular portion of said path and causing such closure member to be pressed against said lower surface of said heater at a second angular portion of said path to seal said closure member to said container.

2. Apparatus according to claim 1 wherein said heater includes annular plate means of heat conducting metal, electrical resistance means disposed in heat conducting relation to said plate means, and means for continuously furnishings electrical current to said resistance means during rotation of said heater.

3. Apparatus according to claim 1 comprising means for feeding a container with a closure member resting thereon to each of said container holders as said container holders move past said first angular portion of said path.

4. Apparatus according to claim 3 comprising means for removing a container having a closure member sealed thereon from each of said container holders after such container holder has moved past said second angular portion of said path.

5. Apparatus according to claim 1 including yieldable means for preventing injury to said containers and closure members as the closure members are pressed against said lower surface of said heater.

6. Apparatus according to claim 1 wherein each of said container holders includes a support surface for contacting the bottom of a container and at least one portion for contacting a side of the container to limit movement of the contacted container portion toward the inside of said circular path.

7. Apparatus according to claim 7 including at least two of said portions for contacting a side of the container, one of said portions contacting an upper portion of the container and another contacting a lower portion of the container.

8. Apparatus according to claim 6 including a generally vertical support element for each of said container holders, means including a spring yieldingly connecting an upper portion of each of said support elements to the corresponding container holder so as to prevent rotation of said container holder relative to said support element but to permit limited vertical movement of said container holder relative to said support element upon loading of said spring, mounting means for permitting vertical movement of each of said support elements, means for moving said mounting means about the axis of said circular path, a stationary cam track extending about said axis, a cam follower on a lower portion of each of said support elements for contacting said cam track to be raised and lowered thereby as said mounting means are moved about said axis, means providing guide slots extending vertically adjacent each of said support elements, and roller means on each of said support elements for riding in one of said guide slots to constrain the individual support elements against rotation about their individual axes.

9. A method of sealing a filled thermoplastic container having a closure member in preassembled relation therewith but not tightly secured thereto including the steps of:
   continuously heating an annular plate to a sealing temperature;
   rotating the heated plate;
   receiving a container and closure member and revolving said container and closure about the axis of rotation of the heated plate at the speed of rotation of the heated plate;
   raising said container and closure members as they move about said axis;
   causing said closure member to come into abutting heat receiving relationship with the heated plate to seal the closure member to the container, and
   lowering the tightly secured container and closure member for transfer thereof.

10. An apparatus for heat sealing a closure member to a container comprising:
   a plurality of container holders, each adapted to hold a container and a closure member therefor in preassembled relation;

a heater plate having a heating surface in line with said plurality of container holders;

means for rotating said heater plate; and means for moving said container holders, for moving a container and associated closure member in heat receiving relationship with said heater plate.

11. A heat sealing apparatus according to claim 10 wherein said heater plate is a continuous circular heating plate.

12. A heat sealing apparatus according to claim 11 wherein said means for moving said container holders includes a resilient lifter means whereby said last named means is adapted to accommodate containers and closures of varying height.

References Cited

UNITED STATES PATENTS

| | | | |
|---|---|---|---|
| 2,399,592 | 4/1946 | Bradshaw | 264—68 |
| 3,580,460 | 5/1971 | Lipschutz | 156—580 |
| 3,499,068 | 3/1970 | Brown | 264—68 |

DAVID KLEIN, Primary Examiner

J. L. GOODROW, Assistant Examiner

U.S. Cl. X.R.

264—68; 156—583